March 17, 1959    P. E. BIEMILLER ET AL    2,877,654
INDEXING MECHANISM
Filed July 14, 1953    2 Sheets-Sheet 1

INVENTOR
PHILIP E. BIEMILLER
JAMES H. REESE
JOHN A. VAN HORN
BY *M.W. Gould*
ATTORNEY March 17, 1959 P. E. BIEMILLER ET AL 2,877,654
INDEXING MECHANISM
Filed July 14, 1953 2 Sheets-Sheet 2

INVENTOR
PHILIP E. BIEMILLER
JAMES H. REESE
JOHN A. VAN HORN
BY M. W. Gould
ATTORNEY United States Patent Office 2,877,654
Patented Mar. 17, 1959

2,877,654

INDEXING MECHANISM

Philip E. Biemiller, Lancaster, James H. Reese, Manheim, and John A. Van Horn, Lancaster, Pa., assignors to Hamilton Watch Company, Lancaster, Pa.

Application July 14, 1953, Serial No. 367,794

5 Claims. (Cl. 74—88)

This invention relates to a mechanism for accomplishing a change of motion from oscillation to intermittent rotary in either direction.

Heretofore, particularly in electric timing movements where there is an oscillating member and where it is desired to translate the oscillating motion of this member to intermittent rotary motion in one direction, the oscillating member engages the teeth of a gear when moving in one direction and slides over said teeth when moving in the other direction. The movement of the oscillating member is then slightly unbalanced by the fact that in one direction it is nearly free to turn and in the other direction it must turn a gear. With the present invention this is equalized by utilizing the movement of the oscillating member to engage the teeth of each gear when moving in either direction.

The object of the present invention is to provide a gearing construction by means of which oscillatory motion may be translated to intermittent rotary motion in either direction.

It is a further object of the present invention to provide an oscillating member which will engage a tooth of one of a pair of connected gears advancing said gear one-half the distance of the circular pitch when moving in one direction and a tooth of the other of the pair of connected gears advancing this gear similarly when moving in the opposite direction so that both gears are moved a distance equal to the circular pitch during one complete cycle of the oscillating member.

It is a further object of the present invention to provide an oscillating member for alternately engaging the teeth of a pair of connected gears and to move the tooth of one gear the distance equal to half of the circular pitch when moving in the one direction and to engage a tooth of the other gear for a like movement when moving in the opposite direction, and during such engagement prevent any movement of the gears beyond the distance of half the circular pitch.

It is a further object of the present invention to provide an oscillating member for alternately engaging the teeth of a pair of connected gears and to connect a third gear to one of said gears to provide intermittent rotary motion in either desired direction or both directions simultaneously.

The invention is illustrated in the accompanying drawings in which.

Figure 1:
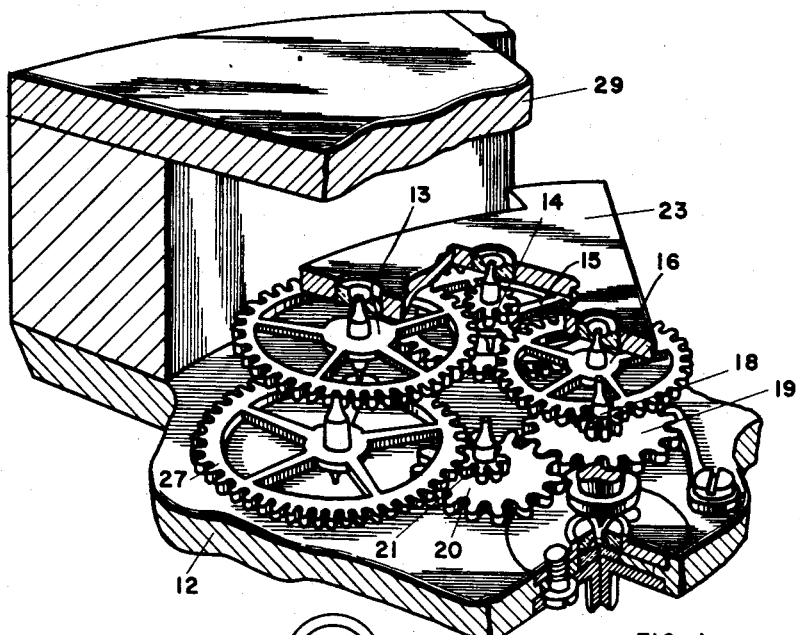
Figure 1 is a view of a train of gears showing the indexing mechanism as connected to a watch.
Figure 2:
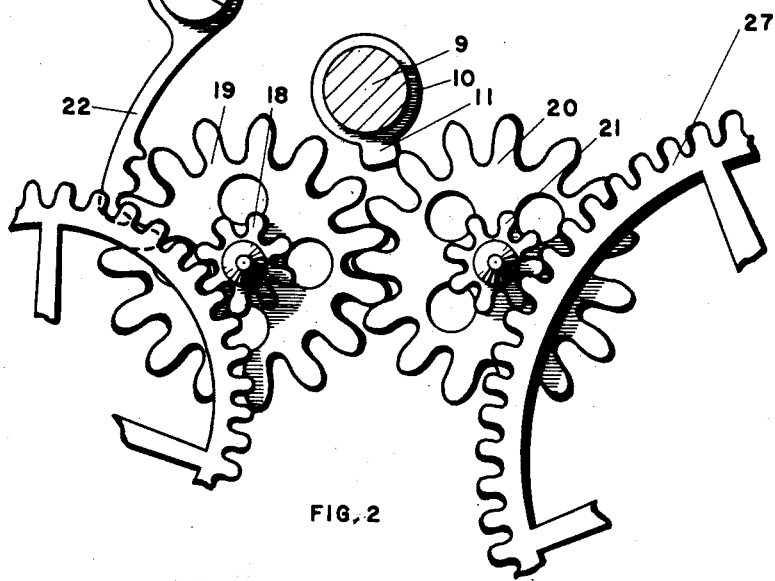
Figure 2 is a detail view of the indexing mechanism with pinions and gears.
Figure 3:
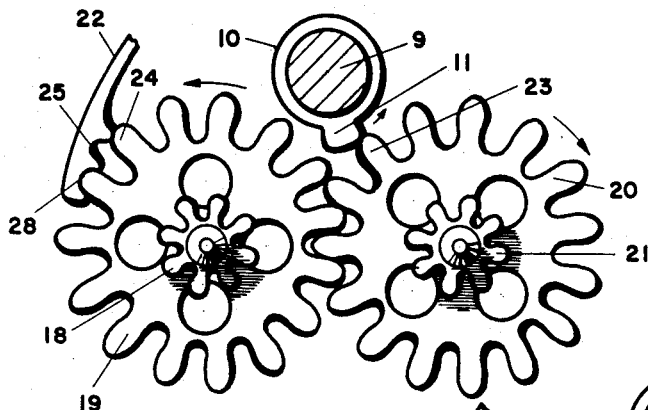
Figure 3 shows the oscillating member with the sector in contact with the clockwise moving gear at the start of the indexing movement.

Referring particularly to Figures 1 and 2 where the oscillating member is a shaft 9, which in this particular adaption is the balance staff of a timepiece, and carries thereon a roller 10 having a sector 11. The length of the arc of the sector 11 is greater than the circular pitch of either gear with which it operates. This is of particular importance as it prevents the driven gear from advancing more than one-half the circular pitch for each contact with the sector.

The pillar plate 12 has journalled therein a train of gears and their respective pinions 13, 14, 15, 16, and 18; 18 being the pinion connected to the indexing wheel 19 moving in a counter-clockwise direction. The other indexing wheel 20 adapted to be driven in a clockwise direction and carrying pinion 21 is connected to a gear 27 which, in this particular setup, is used to operate a seconds hand. A bridge 23 carries the upper pivots for the train. A balance cock 29 together with the pillar plate 12 supports the oscillating member 9.

A spring pawl 22 may be engaged with either or both of the indexing wheels to limit the motion of these wheels. The indexing wheels 19 and 20 are in mesh with each other so that movement of one is transmitted directly to the other.

The invention is for the translation of oscillatory motion of a shaft 9 to intermittent rotary motion which may be selected as to direction, clockwise or counter-clockwise or both. In the illustration herein disclosed, both directions are used. The wheel 27 driven directly by the pinion 21 connects to a second hand and the teeth are so proportioned with regard to the pinion that the hand makes a revolution in one minute. This is, of course, assuming that the shaft maintains a proper rate. The motive power for driving the shaft is not shown but could be an oscillating electric motor, a spring or weights.

Figure 4:
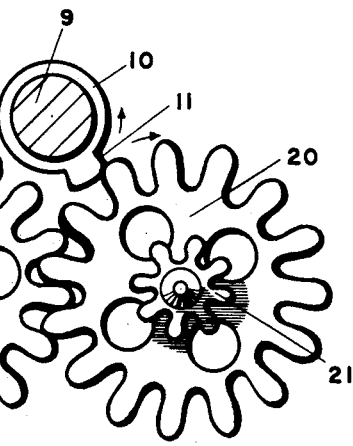
Figure 4 is a similar view at the end of the indexing movement.

Referring particularly to Figures 3, 4, 5, and 6, Figure 3 shows the shaft 9 with the sector 11 just as it engages a tooth 23 of indexing wheel 20 as the oscillating member is beginning a cycle. The sector is moving in a counter-clockwise direction and will move the indexing wheel the distance of half the circular pitch in a clockwise direction. Movement of wheel 20 in a clockwise direction turns the wheel 19 in a counterclockwise direction by the same amount bringing the tooth 24 into the notch 25 of the spring pawl 22, as shown in Figure 4, in which the sector 11 has advanced the index wheel 20 and its connected gear 19 through the distance of half the circular pitch. By definition, circular pitch is the distance between adjacent tooth centers. The width of the sector 11 prevents the gear from moving more than the distance of half the circular pitch at each contact as the following tooth will engage the circumferential face of the sector should the movement of the gear be greater than the desired half a circular pitch.

Figure 5:
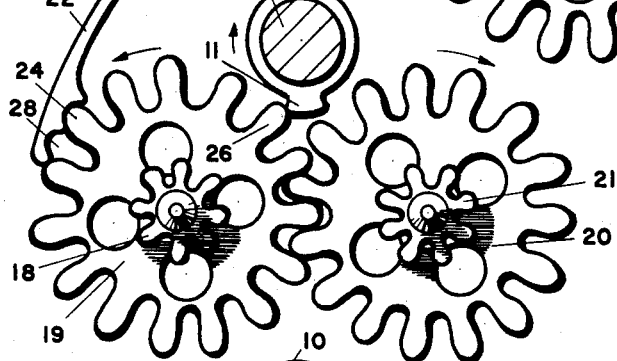
Figure 5 shows the sector in contact with the counter-clockwise moving gear at the start of the movement.
Figure 6:
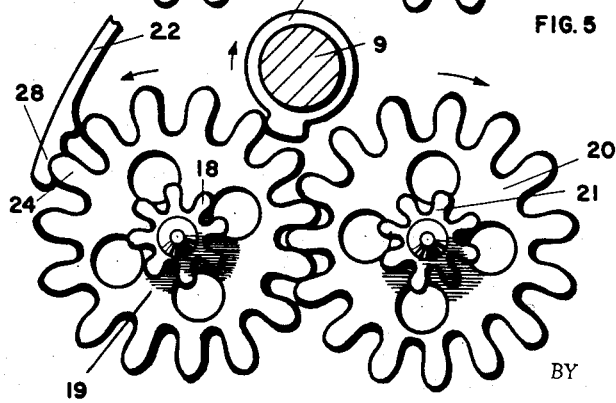
Figure 6 is a similar view at the end of the movement.

After advancing wheel 20 to this position, the oscillating member 9 and its sector 11 are free to continue their rotation until the maximum displacement has been reached. At this point, the direction of rotation is reversed. The sector, now moving in a clockwise direction, can pass the teeth of wheel 20 but will engage a tooth of wheel 19. Figure 5 shows the sector 11 about to engage tooth 26 of indexing wheel 19 moving tooth 24 from under the notch 25 of the pawl 22 and bringing tooth 24 into engagement with notch 28 of the pawl 22, as shown in Figure 6. Here again the counter-clockwise motion of the gear 19 is transmitted to the gear 20 so that intermittent rotary motion in either direction may be had by selecting either pinion 18 or 21 and connecting a gear thereto. After the sector has advanced gear 19 to this position, the oscillating member is free to continue its motion until it reaches its maximum displacement, Again the direction of rotation of the oscillating member reverses. The sector, now moving in a counter-clockwise direction, can pass the teeth of gear 19 and the next cycle will begin when the sector engages the next tooth of gear 20.

It will be seen from the above description that the oscillating motion of a balance staff of a timepiece may be translated to intermittent rotary motion of the hands. The motion was particularly designed for timepieces but may have useful application in other devices, and it is entirely possible in using the motion to translate the oscillating motion to intermittent rotary motion in both directions at the same time.

What is claimed is:

1. A mechanism for translating oscillating motion to intermittent rotary motion in either direction comprising, a pair of meshed indexing gears having the same number of teeth, an oscillating staff, the axes of rotation of said gears and staff being immovably fixed with respect to one another and means mounted on said staff for oscillation therewith for contacting the face of a tooth on one of said gears and wiping outwardly off the edge thereof to continue its motion in one direction, and for contacting the face of a tooth on the other of said gears and wiping outwardly off the edge thereof to continue its motion in the other direction, said means imparting rotary motion to each gear during its oscillation.

2. A mechanism for translating oscillating motion to intermittent rotary motion in either direction according to claim 1, and including means for limiting the rotary motion of either of the gears to one-half the circular pitch of either gear, during each contact of said staff mounted means.

3. A mechanism for translating oscillating motion to intermittent rotary motion in either direction according to claim 1, wherein said staff mounted means is formed with an arc greater than the circular pitch of either of said gears, thus preventing movement of either of the gears beyond one-half the circular pitch with each contact of said means.

4. A mechanism for translating oscillating motion to intermittent rotary motion in either direction, comprising a staff oscillating through an arc of 90° or more, a roller on said staff, identical indexing gears in mesh with each other and having their axes of rotation fixed with respect to the axis of rotation of said staff, means fixedly carried by said roller for contacting said gears, one of said gears being in the path of motion of said contacting means when said means is moving clockwise and the other of said gears being in the path of said contacting means when said means is moving counter-clockwise, said contacting means continuing its motion in the same direction after contact with either of the gears and imparting rotary motion to each gear during its oscillation.

5. A mechanism for translating oscillating motion to intermittent rotary motion in either direction according to claim 1 and including means connected to at least one of said gears to receive the rotary motion thereof.

References Cited in the file of this patent
UNITED STATES PATENTS

| | | |
|---|---|---|
| 1,613,533 | Prince | Jan. 4, 1927 |
| 1,710,631 | Loram | Apr. 23, 1929 |
| 2,354,020 | Howger | July 18, 1944 |

FOREIGN PATENTS

| | | |
|---|---|---|
| 300,658 | Switzerland | Oct. 16, 1954 |
| 1,117,599 | France | May 24, 1956 |